US012734654B2

(12) United States Patent
Hu

(10) Patent No.: US 12,734,654 B2
(45) Date of Patent: Sep. 15, 2026

(54) TORQUE WRENCH WITH DIGITAL DISPLAY FOR TORQUE ADJUSTMENT

(71) Applicant: Bobby Hu, Taichung City (TW)

(72) Inventor: Bobby Hu, Taichung City (TW)

( * ) Notice: Subject to any disclaimer, the term of this patent is extended or adjusted under 35 U.S.C. 154(b) by 672 days.

(21) Appl. No.: 18/024,366

(22) PCT Filed: Oct. 16, 2020

(86) PCT No.: PCT/CN2020/121472

§ 371 (c)(1),
(2) Date: Mar. 2, 2023

(87) PCT Pub. No.: WO2022/077433

PCT Pub. Date: Apr. 21, 2022

(65) Prior Publication Data

US 2023/0256574 A1 Aug. 17, 2023

(51) Int. Cl.
*B25B 23/142* (2006.01)

(52) U.S. Cl.
CPC ................................ *B25B 23/1427* (2013.01)

(58) Field of Classification Search
CPC ............ B25B 23/1427; B25B 23/1425; B25B 23/1422; B25B 23/14; B25B 23/16; B25B 23/1405; B25B 23/141
USPC ............................................................ 81/467
See application file for complete search history.

(56) References Cited

U.S. PATENT DOCUMENTS

| | | | | |
|---|---|---|---|---|
| 2,190,966 | A | 2/1940 | Zimmerman | |
| 2,250,941 | A | 7/1941 | Zimmerman | |
| 3,847,038 | A * | 11/1974 | Green | B25B 23/1427 81/477 |
| 4,290,329 | A * | 9/1981 | Green | B25B 23/1427 81/477 |
| 4,467,678 | A | 8/1984 | Lindholm | |
| 5,537,877 | A | 7/1996 | Hsu | |
| 2016/0031070 | A1 | 2/2016 | Ball | |
| 2024/0075599 | A1 * | 3/2024 | Reeder | B25B 23/1427 |

FOREIGN PATENT DOCUMENTS

| | | | |
|---|---|---|---|
| CN | 102216035 | A | 10/2011 |
| CN | 107914234 | A | 4/2018 |
| CN | 108687710 | A | 10/2018 |
| CN | 209632889 | U | 11/2019 |
| EP | 2774724 | A1 | 9/2014 |
| TW | 200621443 | A | 7/2006 |

* cited by examiner

*Primary Examiner* — Brian D Keller
(74) *Attorney, Agent, or Firm* — WPAT, PC

(57) ABSTRACT

The present invention provides a torque wrench with digital display for torque adjustment, including a main body, a wrenching member, a trigger mechanism, a torque adjustment device, and a torque sensing device. The torque adjustment device includes an elastic member, a moving member, a transmission gear, and a modulating member. The modulating member rotationally drives the transmission gear to rotate, so as to drive the moving member to generate a linear displacement, thereby adjusting the support position of the moving member with respect to the elastic member, achieving an efficient torque value adjustment effect and purpose.

13 Claims, 11 Drawing Sheets

TORQUE WRENCH WITH DIGITAL DISPLAY FOR TORQUE ADJUSTMENT

BACKGROUND OF THE INVENTION

1. Field of the Invention

The present invention relates to torque wrenches, and more particularly, to a torque wrench with digital display for easy torque adjustment.

2. Description of the Related Art

A conventional torque wrench provides the torque setting and reading functions through the torque value scale on the body thereof, allowing the user to determine whether the set torque value has been reached during the wrenching operation. However, the reading function provided by the conventional torque wrench fails to facilitate a directly carried out reading process.

Therefore, a torque wrench cited as U.S. Pat. No. 5,537,877 with the title of "TORSION WRENCH WITH DISPLAY UNIT FOR DISPLAYING TORSION FORCE LIMIT THEREON" is then developed by the industry. Said torsion wrench is a torque wrench that digitally displays the torque value. To set the torque of it, the handle is rotated to drive the push rod unit to rotate, so that the actuating block of the biasing unit axially displaces, so as to trigger the push piece to drive the slider of the torsion force detecting unit to slide, thereby changing the resistance of the corresponding variable resistance, such that the resistance variation is converted by the conversion circuit to be digitally displayed as the torsion force value on the display. Said torsion wrench resolves the disadvantage of the conventional torque wrench whose torque value fails to be easily read; however, the variable resistance of said torsion wrench is easily affected by environmental factors, such as ambient moisture or shaking during operation, so that the voltage output is unstable, affecting the judgment of the torque value. Further, when the torque of said torsion wrench is being adjusted, the handle is rotated to drive the rotation of the push rod, whose second end is connected to the push piece through a thread, so that the rotation of the push rod drives the push piece to be biased against the spring in order to adjust the push force imposed on the detachment mechanism, achieving the torque value adjustment of the torsion wrench. To adjust the torque value in this screw threading manner, the user has to carry out the rotating adjustment circle by circle. During the adjusting action, the elastic force of the spring must be overcome, so that the operation speed is too slow and inefficient. For example, the process of adjustment from the minimum torque value to the maximum torque value is very time-consuming and laborious, failing to meet the convenience of usage, unable to be efficiently and easily adjusted from the minimum torque to the maximum torque (and vice versa).

Referring to the torque wrench disclosed by U.S. Patent Publication No. 2016/0031070A1 with the title of "TORQUE WRENCH", said patent publication is another torque wrench that electronically displays the torque value. By use of the contact between the scraper on the thread rod and the membrane potentiometer, it senses the resistance variation therebetween, so as to sense the torque value of the torque wrench and displays the torque value on the display. However, the contact between the scraper and the membrane potentiometer easily causes the variation of resistance due to temperature changes and friction, so that the accuracy of the potentiometer is affected, thereby affecting the accuracy of the torque value. Furthermore, to adjust the torque value of said patent publication, the adjustment knob is used to drive the rotation of the thread rod, which is connected to the connector through the thread. The rotation of the thread rod drives the connector to be biased against the spring, so as to adjust the pushing force imposed on the detachment mechanism, thereby adjusting the torque value of the torque wrench. However, such method still adjusts the torque value in a screw threading manner, so the adjusting is still slow, time-consuming, and laborious, failing to facilitate the convenience of usage, also unable to be efficiently and easily adjusted from the minimum torque to the maximum torque (and vice versa).

SUMMARY OF THE INVENTION

To improve the issues above, the present invention discloses a torque wrench with digital display for easy torque adjustment, which converts the rotation operation into a linear movement for efficiently adjusting the torque value, allowing the user to easily operate it and providing an efficient and easily adjustment from the minimum torque to the maximum torque and vice versa.

For achieving the aforementioned objectives, a torque wrench with digital display for torque adjustment in accordance with an embodiment of the present invention is provided, comprising a main body, a wrenching member, a trigger mechanism, a torque adjustment device, and a torque sensing device. The main body comprises a first end and a second end away from the first end. The wrenching member is pivotally disposed on the main body and allowed to sway with respect to the main body. The wrenching member comprises a wrenching part exposed out of the main body and a connecting part pivotally connected with the first end of the main body. The connecting part comprises a contacting end away from the wrenching part. The trigger mechanism is disposed in the main body and contacts the contacting end of the connecting part. The torque adjustment device is disposed in the main body and connected with the trigger mechanism. The torque adjustment device is operated by the user to adjust the predetermined torque. The torque adjustment device comprises an elastic member, a moving member, a transmission gear, a modulating member. The elastic member comprises a fixing end and a free section connected with the fixing end. The fixing end is fixed to the trigger mechanism. The moving member is slidably disposed in the main body along an axis direction of the main body. The moving member comprises an abutting part, against which the free section abuts when bearing a force imposed thereon. The moving member comprises a first tooth part disposed along a direction in parallel to the axis direction. The transmission gear comprises a second tooth part which is engaged with the first tooth part. The modulating member is connected with the transmission gear. The modulating member is configured to be rotated by the user to drive the moving member to generate a linear sliding relationship with respect to the main body, facilitating a positional adjustment of the abutting part with respect to the free section. The torque sensing device is disposed on the main body corresponding to the torque adjustment device. The torque sensing device is configured to sense a displacement variation of the moving member, so as to display a torque value on the digital display.

With such configuration, the present invention applies the rotationally operated modulating member, so that the modulating member drives the transmission gear to rotate, thereby driving the moving member to generate the linear displacement, facilitating an efficient torque adjusting function, achieving the time-saving and labor-saving effects.

DETAILED DESCRIPTION OF THE INVENTION

Figure 1:
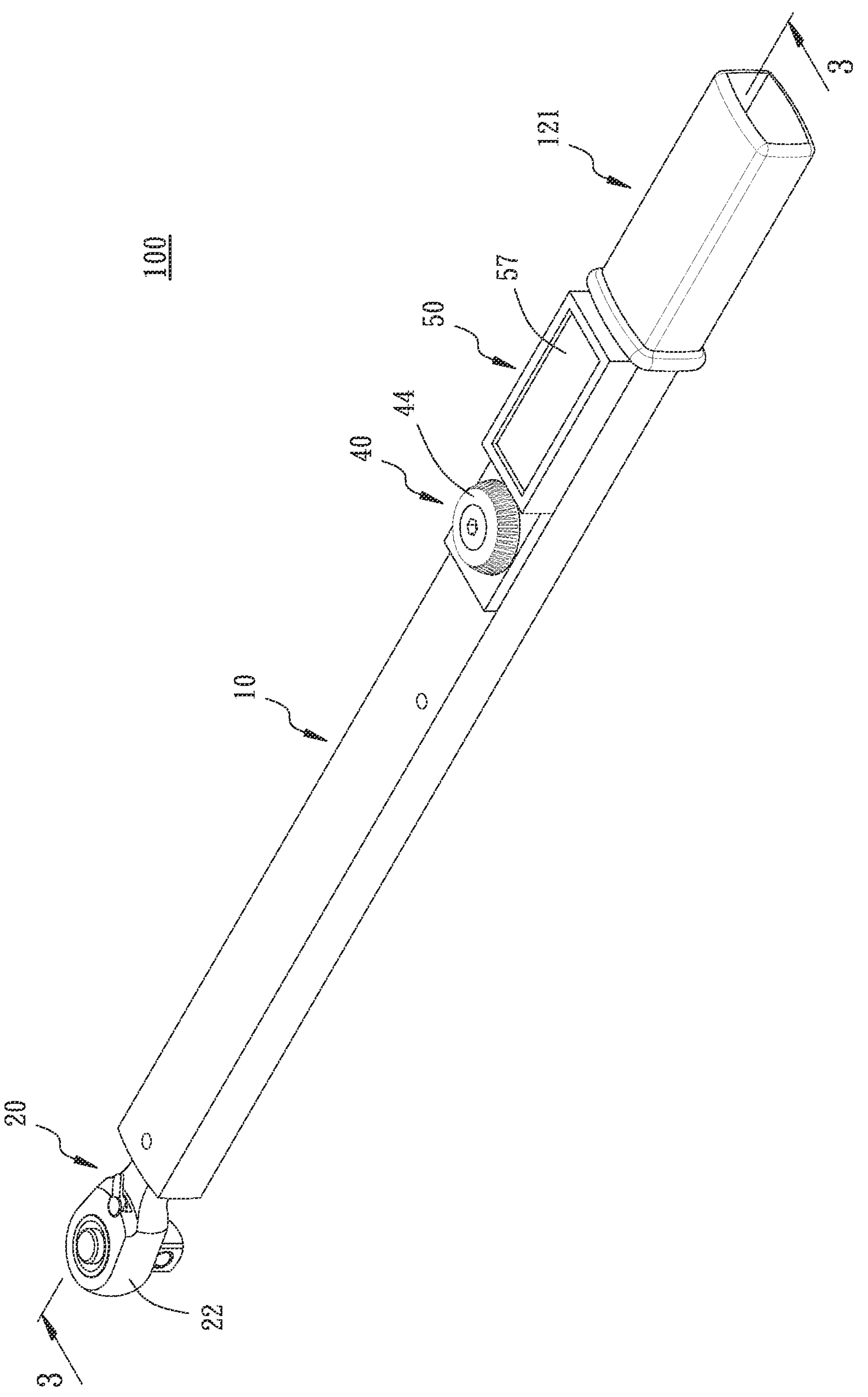
FIG. 1 is a perspective view of the torque wrench with digital display for torque adjustment in accordance with the first embodiment of the present invention.
Figure 2:
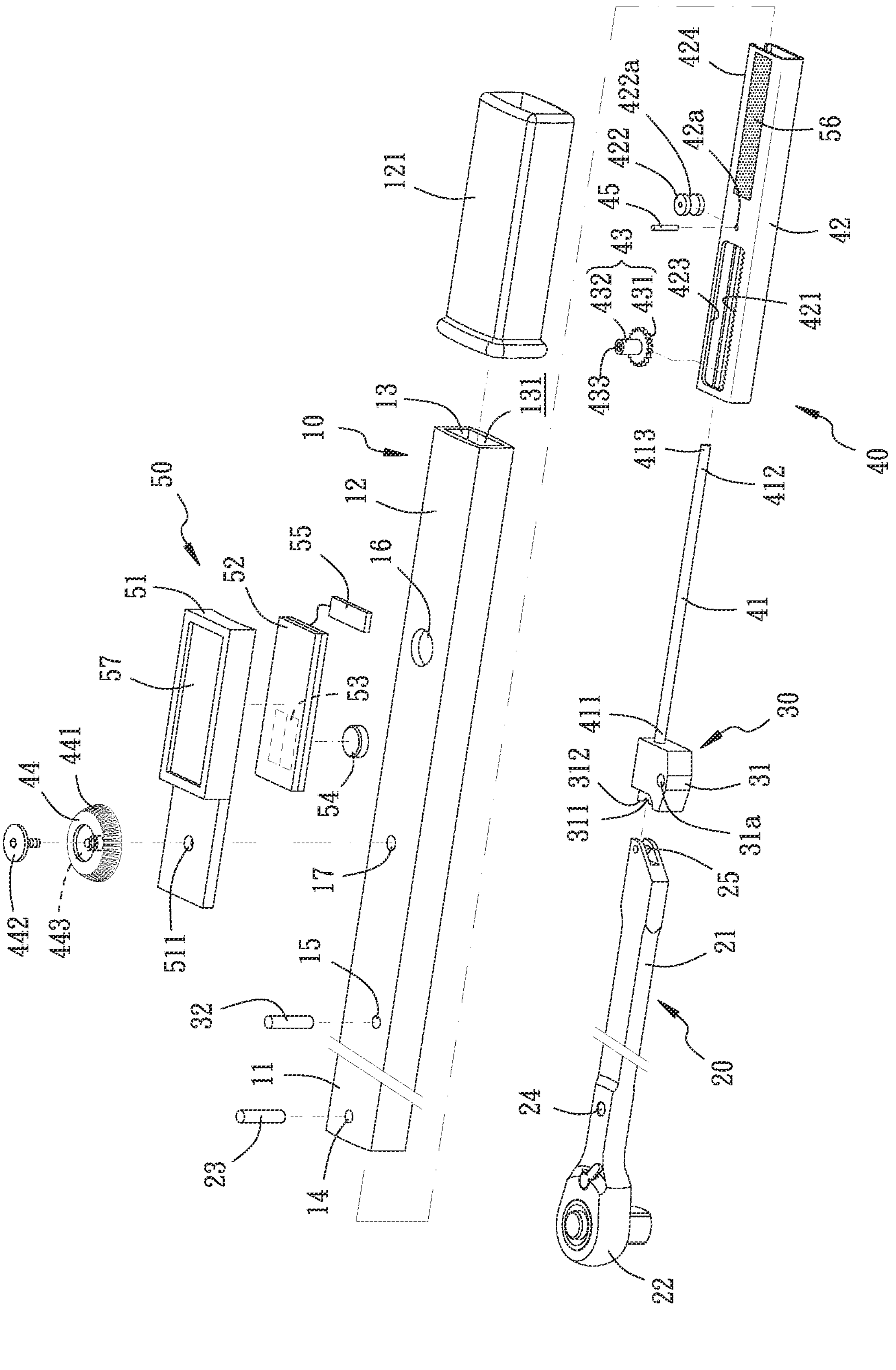
FIG. 2 is an exploded view of the torque wrench with digital display for torque adjustment in accordance with the first embodiment of the present invention.

Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Referring to FIG. 1 to FIG. 8, the present invention provides a first embodiment of a torque wrench 100 with digital display for easy torque adjustment, comprising a main body 10, a wrenching member 20, a trigger mechanism 30, a torque adjustment device 40, and a torque sensing device 50.

The main body 10 comprises an axis L1, with a first end 11 and a second end 12 away from the first end 11 disposed on two ends of the axis L1, and the main body 10 is hollow and comprises a containing space 13. Therein, in this embodiment of the present invention, the main body 10 is formed in a flat rectangular hollow tube shape, and the containing space 13 comprises a guiding part 131 therein. Besides, the main body 10 comprises two pivot holes 14, 15 on the first end 11 and a through hole 16 on the second end 12, and the pivot holes 14, 15 and the through hole 16 are respectively in communication with the containing space 13, and an installation bore 17 is further disposed between the pivot hole 15 and the through hole 16 to be in communication with the containing space 13.

The wrenching member 20 is pivotally disposed on the main body 10 and allowed to generate a swaying relationship with respect to the main body 10. The wrenching member 20 comprises a connecting part 21 and a wrenching part 22 exposed out of the main body 10. The wrenching part 22 is applied to be combined with the to-be-driven fastener. The connecting part 21 is inserted in to the first end 11. The wrenching member 20 is pivotally connected with the main body 10 through a fixing pin 23 passing through the pivot hole 14 of the main body 10 and a pivot hole 24 of the wrenching member 20. The connecting part 21 comprises a contacting end 25 away from the wrenching part 22. The contacting end 25 is a circular pin and is disposed on the distal end of the connecting part 21 away from the wrenching part 22.

The trigger mechanism 30 is disposed in the main body 10 and contacts the contacting end 25 of the connecting part 21. The trigger mechanism 30 sways between a first position and a second position. In this embodiment of the present invention, the trigger mechanism 30 comprises a triggering member 31 and a positioning pin 32. The triggering member 31 is pivotally connected between the first end 11 and the second end 12 of the main body 10 through the positioning pin 32 passing through the pivotal hole 15 of the main body 10 and a pivot hole 31*a* of the triggering member 31. Also, the triggering member 31 is allowed to be releasably connected with the contacting end 25 of the wrenching member 20. Therein, the triggering member 31 comprises a connection recess 311 on one side facing the contacting end 25, and the connection recess 311 has one side connected with a recovering bevel 312, such that the contacting end 25 is releasably connected between the connection recess 311 and the recovering bevel 312.

The torque adjustment device 40 is disposed in the main body 10 and connected with the trigger mechanism 30. The torque adjustment device 40 is operated by the user to adjust the predetermined torque, whereby the trigger mechanism 30 abuts against the contacting end 25 of the connecting part 21. The torque adjustment device 40 comprises an elastic member 41, a moving member 42, a transmission gear 43, and a modulating member 44. The elastic member 41 is formed in a stick form, comprising a fixing end 411 and a free section 412 connected with the fixing end 411. The fixing end 411 is connected and fixed to the triggering member 31. In this embodiment of the present invention, the free section 412 of the elastic member 41 comprises an abutting section 413 having a semi-circular section disposed on a lateral face of the free section 412.

The moving member 42 is formed in an approximate frame shape and slidably disposed in the main body 10 along the direction of the axis L1 of the main body 10. The moving member 42 is disposed in the containing space 13 of the main body 10, and slidably arranged in the main body 10 along the guiding part 131. The outline of the moving member 42 is approximately identical to the shape of the guiding part 131.

The moving member 42 comprises a first tooth part 421 and an abutting part 422, against which the free section 412 abuts when bearing a force imposed thereon. The first tooth part 421 is disposed along the direction in parallel to the axis L1 and formed in a straight shape. The abutting part 422 is rotatably disposed on the moving member 42 and moves along with the moving member 42. The moving member 42 further comprises a movement groove 423, and the first tooth part 421 is disposed on one side of the inner edge of the movement groove 423. The free section 412 of the elastic member 41 passes through the moving member 42, so that the abutting part 422 contacts and abuts against an abutting section 413 of the free section 412, such that the moving member 42 moves to carry the abutting part 422 to move, thereby changing the supporting position of the abutting part 422 abutting against the free section 412 of the elastic member 41. The abutting part 422 is a roller. The abutting part 422 is pivotally disposed in the pivot hole 42*a* of the moving member 42 through a fixing pin 45. The abutting part 422 comprises a supporting groove 422*a*. The supporting groove 422*a* is formed in a semi-circular concave shape and cooperates with the abutting section 413, so that the abutting part 422 is in a roll contact with the free section 412 of the elastic member 41.

It should be noted that, to make the elastic member 41 bear the wrenching torque of the torque wrench 100, the elastic member 41 is able to be considered as the force arm, the wrenching member 20 is the force imposing point, and the abutting part 422 is the force fulcrum, such that the adjustment of the distance between the abutting part 422 and the wrenching member 20 is able to decide the set torque value of the torque wrench 100. In other words, when the abutting part 422 is adjusted to be away from the wrenching member 20, during the wrenching of the torque wrench 100, the torque acted by the wrenching member 20 on the abutting part 422 is larger, so that a portion of the elastic member 41 from the triggering member 31 to the abutting part 422 is imposed with the counterforce of the wrench member 20, so as to be easily bent and deformed in the moving member 42, indicating that the set torque value of the torque wrench 100 is smaller. When the abutting part 422 is adjusted to be closer to the wrenching member 20, during the wrenching of the torque wrench 100, the torque acted by the wrenching member 20 on the abutting part 422 is smaller, so that the portion of the elastic member 41 from the triggering member 31 to the abutting part 422 is not easily imposed with the counterforce of the wrench member 20 to be bent and deformed in the moving member 42, indicating that the set torque value of the torque wrench 100 is larger. Therefore, by adjusting the support position of the abutting part 244 with respect to the elastic member 41, the present invention achieves the adjustment of the torque value of the torque wrench 100.

The transmission gear 43 comprises a first rotation radium R1 and a second tooth part 431 disposed along the direction in perpendicular to the axis L1. The second tooth part 431 is engaged with the first tooth part 421, and the number of teeth of the second tooth part 431 is smaller than the number of teeth of the first tooth part 421. In addition, the second tooth part 431 of the transmission gear 43 is disposed surrounding a central line L2. The central line L2 is orthogonal to the axis L1. The transmission gear 43 comprises a rotation shaft 432 disposed along the direction of the central line L2.

The modulating member 44 is rotatably disposed on the main body 10 along the central line L2 to be rotated by the user. In this embodiment of the present invention, the modulating member 44 is a rotary disc disposed on the outer periphery of the main body 10. The modulating member 44 comprises a second rotation radius R2 which is larger than the first rotation radius R1. The modulating member 44 is coaxially disposed with the rotation shaft 432 of the transmission gear 43, so as to be connected with the transmission gear 43. Therein, the modulating member 44 comprises an outer periphery 441 arranged along the second rotation radius R2, so that the modulating member 44 is formed in an approximately circular disk shape. Also, the modulating member 44 is screwed to a thread bore 433 of the rotation shaft 432 of the transmission gear 43 through a fixing screw 442 passing through a through hole 443 of the modulating member 44. In this embodiment of the present invention, the second rotation radius R2 refers to the distance of the force arm for the user to impose the force on the modulating member 44 to rotate about the central line L2. When the user imposes the force on the modulating member 44, the modulating member 44 simultaneously drives the transmission gear 43 to rotate, such that, through the engagement relationship between the transmission gear 43 and the moving member 42, the moving member 42 is driven to linearly slide with respect to the main body 10, facilitating the position adjustment of the abutting part 422 with respect to the free section 412, thereby further adjusting the position of the abutting part 422 with respect to the elastic member 41.

It should be noted that, because the second rotation radius R2 of the modulating member 44 is larger than the first rotation radius R1, the user is allowed to drive the rotation of the transmission gear 43 with a relatively smaller force, such that the transmission gear 43 drives the moving member 42 to slide, without any resistance of spring during the adjustment process, thereby achieving an efficient torque adjustment effect. Also, in this embodiment of the present invention, the modulating member 44 allows the user to rotate it for only 0 to 3 rounds to simultaneously carry the transmission gear 43 to drive the moving member 42 for an efficient adjustment from the minimum torque value to the maximum torque value, finishing the whole adjustment travel. Further, in this embodiment of the present invention, the rotation travel of the modulating member 44 ranges from 0 to 1.5 rounds for example. Furthermore, because the modulating member 44 is easy to be operated to rotate, the torque adjustment device 40 facilitates a fine adjustment of torque.

The torque sensing device 50 is disposed on the main body 10 corresponding to the position of the torque adjustment device 40. The torque sensing device 50 is configured to sense the displacement variation of the moving member 42, and correspondingly display a torque value through a digital display 57, allowing the user to promptly know the previous setting status of the torque value, facilitating the convenience of operation. The torque sensing device 50 comprises a casing 51, a circuit board 52, a processing unit 53, a power source 54, a sensing member 55, a sensed member 56, and the digital display 57.

The digital display 57 is disposed on the surface of the casing 51 and arranged on the same side of the torque wrench 100 with the modulating member 44. The circuit board 52 is disposed between the casing 51 and the main body 10. The digital display 57 is electrically connected with the processing unit 53. The sensing member 55 and the processing member 53 are disposed on the circuit board 52. The power source 54 provides the power of the torque sensing device 50. The sensed member 56 is disposed on a plane 424 of the moving member 42 to move along with it. The sensing member 55 is configured to sense the displacement variation of the sensed member 56 in a non-contact manner to generate a torque signal. The digital display 57 displays the torque value according to the torque signal. In this embodiment of the present invention, the sensing member 55 senses the displacement variation of the sensed member 56 through the through hole 16.

To further illustrate, the sensing method between the sensing member 55 and the sensed member 56 is allowed to be light sensing or magnetic field sensing. If the light sensing method is applied, the sensing member 55 is able to comprise the light emitting and light receiving functions, and the sensed member 56 comprises a grating structure. When the sensed member 56 linearly moves, the light is emitted to the grating structure. Through the light reflecting and shading of the grating structure, the accordingly generated optical characteristics are received by the sensing member 55, so as to correspondingly generate a light signal, which is processed and converted into the torque signal by the processing unit 53, and the digital display 57 then displays the corresponding torque value, completing the light sensing process of the displacement variation of the moving member 42. If the magnetic field sensing method is applied, the sensing member 55 is a magnetic sensor, and the sensed member 56 is a magnet, with a non-contact fixed gap formed between the magnetic sensor and the magnet. When the magnet linearly moves along with the moving member 42, the magnetic sensor senses the magnetic field variation between the magnetic sensor and the magnet to generate a corresponding voltage signal, which is processed and converted into the torque signal by the processing unit 53, and the digital display 57 then displays the corresponding torque value, completing the magnetic field sensing process of the displacement variation of the moving member 42.

Therefore, the present invention senses the displacement variation of the moving member 42 in a non-contact manner to detect the corresponding torque value, so as to prevent the sensing effect from being affected by environmental factors and accurately presenting the torque value. Also, since there is no contact wearing issue, the service life of the present invention is increased.

In addition, the main body 10 of the present invention further comprises a handgrip member 121 mounted around the second end 12 of the main body 10 for handgrip operation. The distance from the modulating member 44 to the handgrip member 121 is larger than the distance from the digital display 57 to the handgrip member 121; in other words, the digital display 57 is located between the handgrip member 121 and the modulating member 44, such that the modulating member 44 is away from the handgrip member 121 to prevent accidentally triggering during usage. Also, the second rotation radius R2 of the modulating member 44 is larger than the width of the digital display 57, facilitating the convenience of operation.

Figure 3:
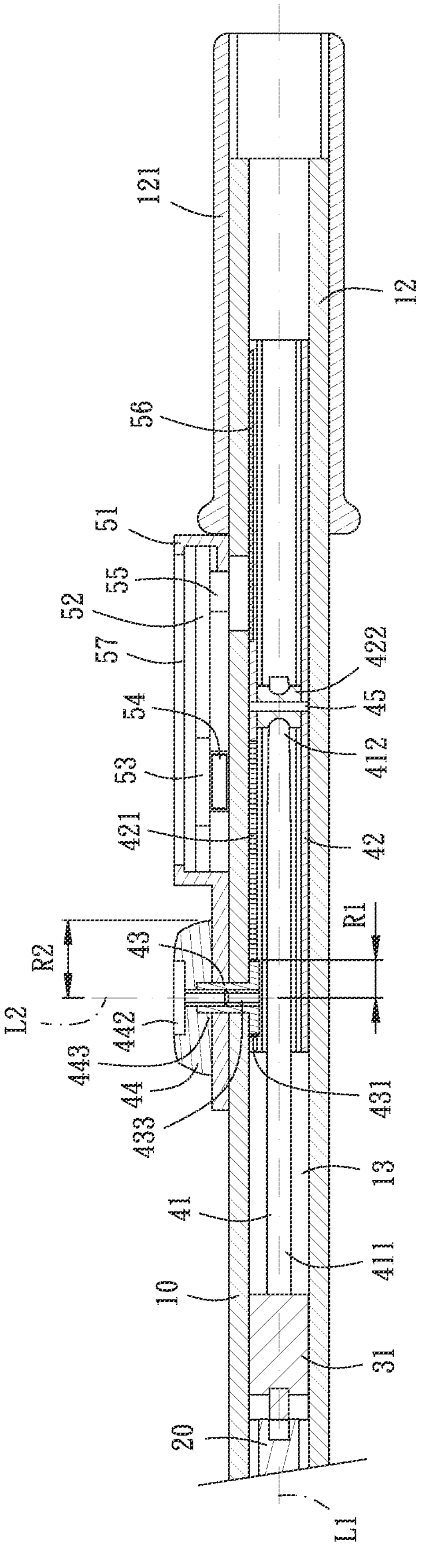
FIG. 3 is a partially cross-sectional view taken along line 3-3 of FIG. 1.
Figure 4:
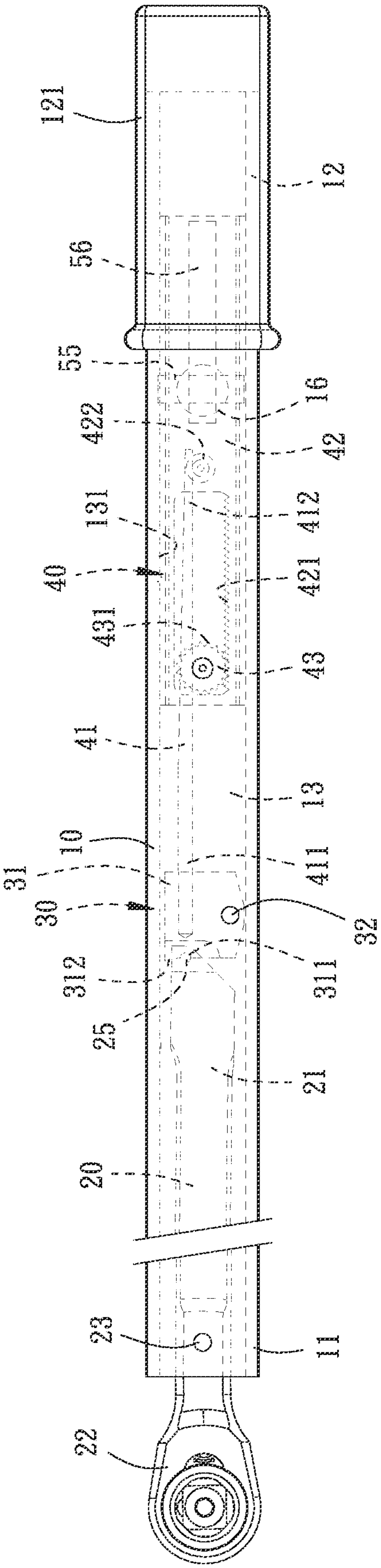
FIG. 4 is a schematic internal view of the torque wrench with digital display for torque adjustment in accordance with the first embodiment of the present invention, illustrating the abutting part at the lower limit position, with the torque value of the torque wrench set to the minimum value.

Referring to FIG. 3 and FIG. 4, the abutting part 422 is at the lower limit position, indicating that the torque value of the torque wrench 100 is set to the minimum. The abutting part 422 is supported at the distal end of the free section 412 of the elastic member 41 and at the largest distance from the wrenching member 20. At the same time, the triggering member 31 abuts against the contacting end 25 of the wrenching member 20 through the connection recess 311. At this time, the trigger mechanism 30 is at the first position. The modulating member 44 is allowed to be rotated by the user for driving the moving member 42 to move and adjusting the position of the abutting part 422 with respect to the free section 412, facilitating an efficient and easy adjustment from the minimum torque to the maximum torque.

Figure 5:
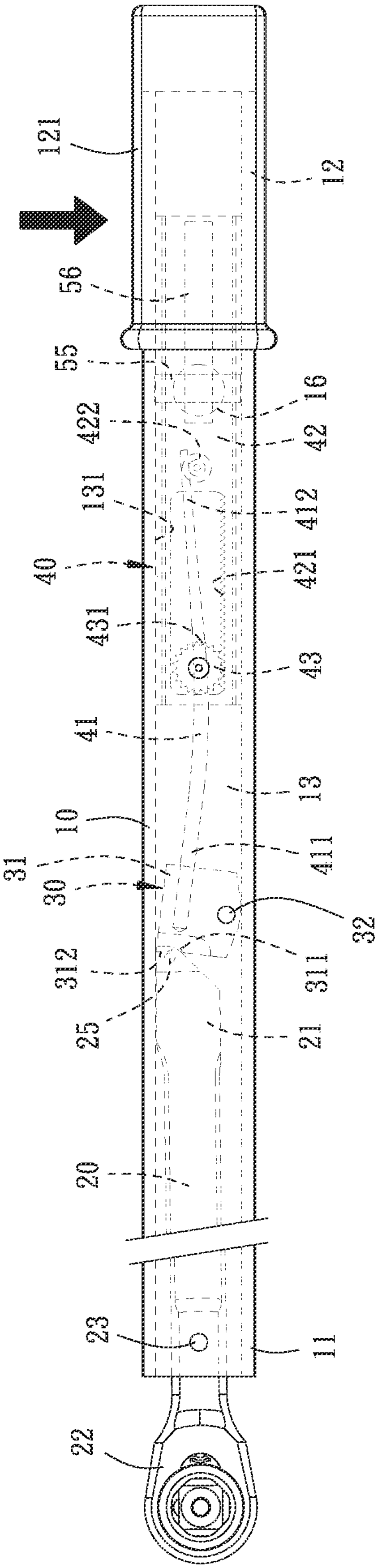
FIG. 5 is a schematic internal view similar to FIG. 4, schematically illustrating the wrenching operation of the torque wrench with digital display for torque adjustment in accordance with the first embodiment of the present invention.

Referring to FIG. 5, then when the torque wrench 100 is used to wrench the fastener through the wrenching part 22 of the wrenching member 20, because the torque value is set at the minimum, the portion of the elastic member 41 from the triggering member 31 to the abutting part 422 bears the counterforce of the wrenching member 20, so as to generate a larger bending deformation in the moving member 42. Meanwhile, when the wrenching force of the torque wrench 100 is larger than the torque value of the torque adjustment device 40, the triggering member 31 is released from the contacting end 25, and the triggering member 31 pivotally sways with respect to the main body 10, so that the contacting end 25 is located at the recovering bevel 312, preventing the user from keeping imposing the force to over-screw the fastener. At this time, the trigger mechanism 30 is at the second position, and the elastic member 41 allows the trigger mechanism 30 to provide a force for the wrenching member 20 to be recovered. When the wrenching force of the torque wrench 100 is smaller than the torque of the torque adjustment device 40 (or when the wrenching force is removed), the recovering bevel 312 automatically guides the triggering member 31, so that the connection recess 311 of the triggering member 31 is recovered to the contacting status with the contacting end 25.

Figure 6:
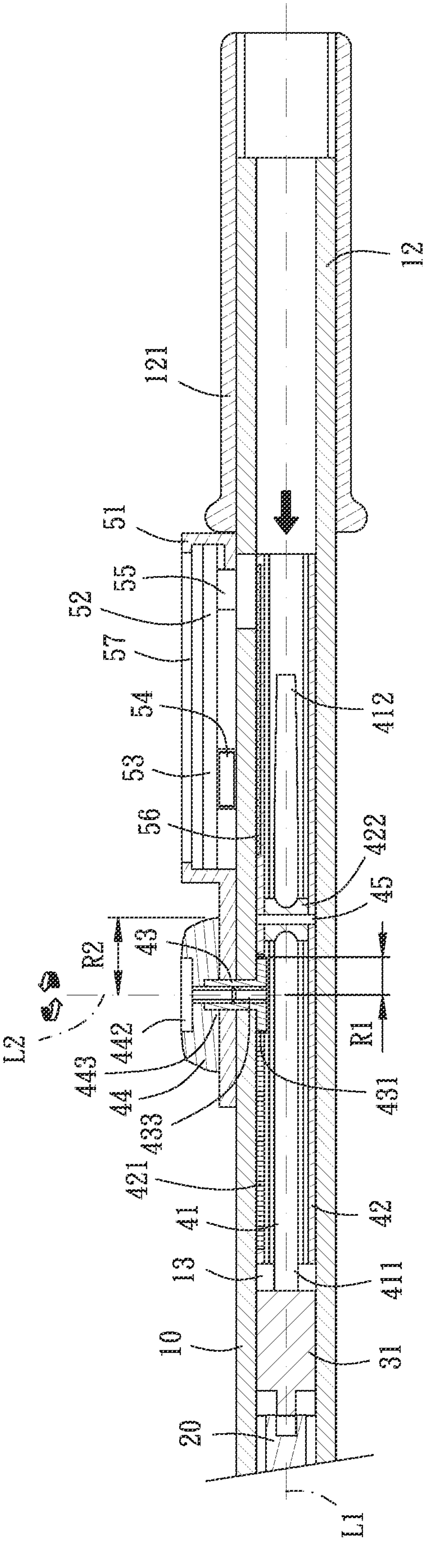
FIG. 6 is a side sectional view of the torque wrench with digital display for torque adjustment in accordance with the first embodiment of the present invention, illustrating the modulating member rotating to drive the moving member to linearly move, adjusting the abutting part to the upper limit position.
Figure 7:
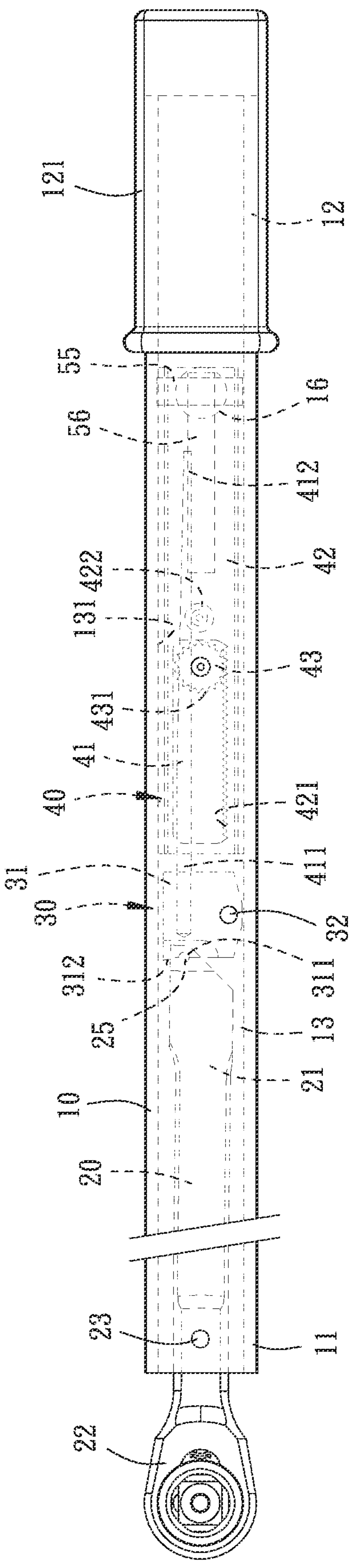
FIG. 7 is another schematic internal view of the torque wrench with digital display for torque adjustment in accordance with the first embodiment of the present invention, illustrating the abutting part at the upper limit position, with the torque value of the torque wrench set to the maximum value.

Referring to FIG. 6 and FIG. 7, the user is able to turning the modulating member 44 to adjust the torque value, so that the modulating member 44 rotates to drive the transmission gear 43 to rotate, thereby driving the moving member 42 to linearly move along the direction of the axis L1 with respect to the main body 10, that is, to move toward the triggering member 31, so as to adjust the abutting part 422 from the lower limit position to the upper limit position, indicating that the torque value of the torque wrench 100 is set to the maximum. Regarding such adjustment, because the second rotation radius R2 is larger than the first rotation radius R1, the user is able to efficiently finish the adjusting action by rotating the modulating member 44 for only 1 to 2 rounds, facilitating a time-saving, labor-saving, and convenient usage. At this time, the trigger mechanism 30 is at the first position. The modulating member 44 is allowed to be rotated by the user for driving the moving member 42 and adjusting the position of the abutting part 422 with respect to the free section 412, facilitating an efficient and easy adjustment from the minimum torque to the maximum torque.

Along with the adjustment of the moving member 42, the abutting part 422 is efficiently adjusted to the upper limit position. The abutting part 422, which was supported at the distal end of the free section 412 of the elastic member 41, moves to the approximate center section of the free section 412, so as to be closer to the wrenching member 20, indicating the torque value of the torque wrench 100 is set at the maximum.

Figure 8:
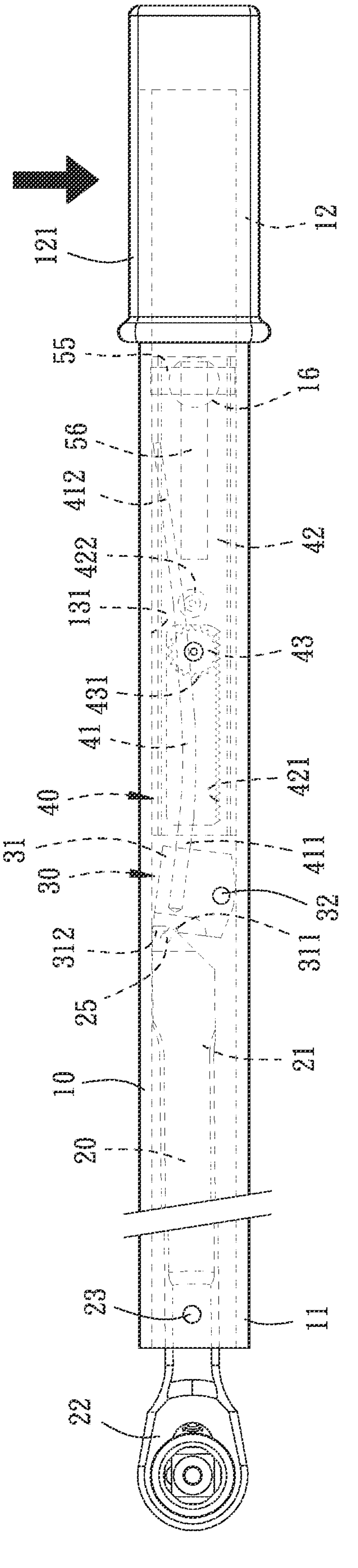
FIG. 8 is a schematic internal view similar to FIG. 7, schematically illustrating the wrenching operation of the torque wrench with digital display for torque adjustment in accordance with the first embodiment of the present invention.

Then, referring to FIG. 8, when the torque wrench 100 is used to wrench the fastener through the wrenching part 22 of the wrenching member 20, because the torque value is set at the maximum, the portion of the elastic member 41 from the triggering member 31 to the abutting part 422 bears the counterforce of the wrenching member 20, so as to generate a smaller bending deformation in the moving member 42, compared with the bending deformation generated when the torque value is set at the minimum. When the wrenching force of the torque wrench 100 is larger than the torque value of the torque adjustment device 40, the triggering member

31 of the trigger mechanism 30 is released from the contacting end 25, so that the contacting end 25 is located at the recovering bevel 312, preventing the user from keeping imposing the force to over-screw the fastener. At this time, the trigger mechanism 30 is at the second position, and the elastic member 41 allows the trigger mechanism 30 to provide a force for the wrenching member 20 to be recovered. Afterward, to be recovered to the position shown in FIG. 3 and FIG. 4, the aforementioned adjustment action is repeated, such that the present invention facilitates an efficient and easy adjustment from the maximum torque to the minimum torque as well.

With such configuration, the present invention converts the rotation operation into a linear movement for efficiently adjusting the torque value, allowing the user to easily operate it and providing an efficient and easily adjustment from the minimum torque to the maximum torque and vice versa. Therein, most of the components of the torque adjustment device 40 are directly installed in the containing space 13 of the main body 10, so that the overall structure is simple, the assembly is efficient, the manufacturing cost is low, and the industrial competitive advantage is achieved.

Figure 9:
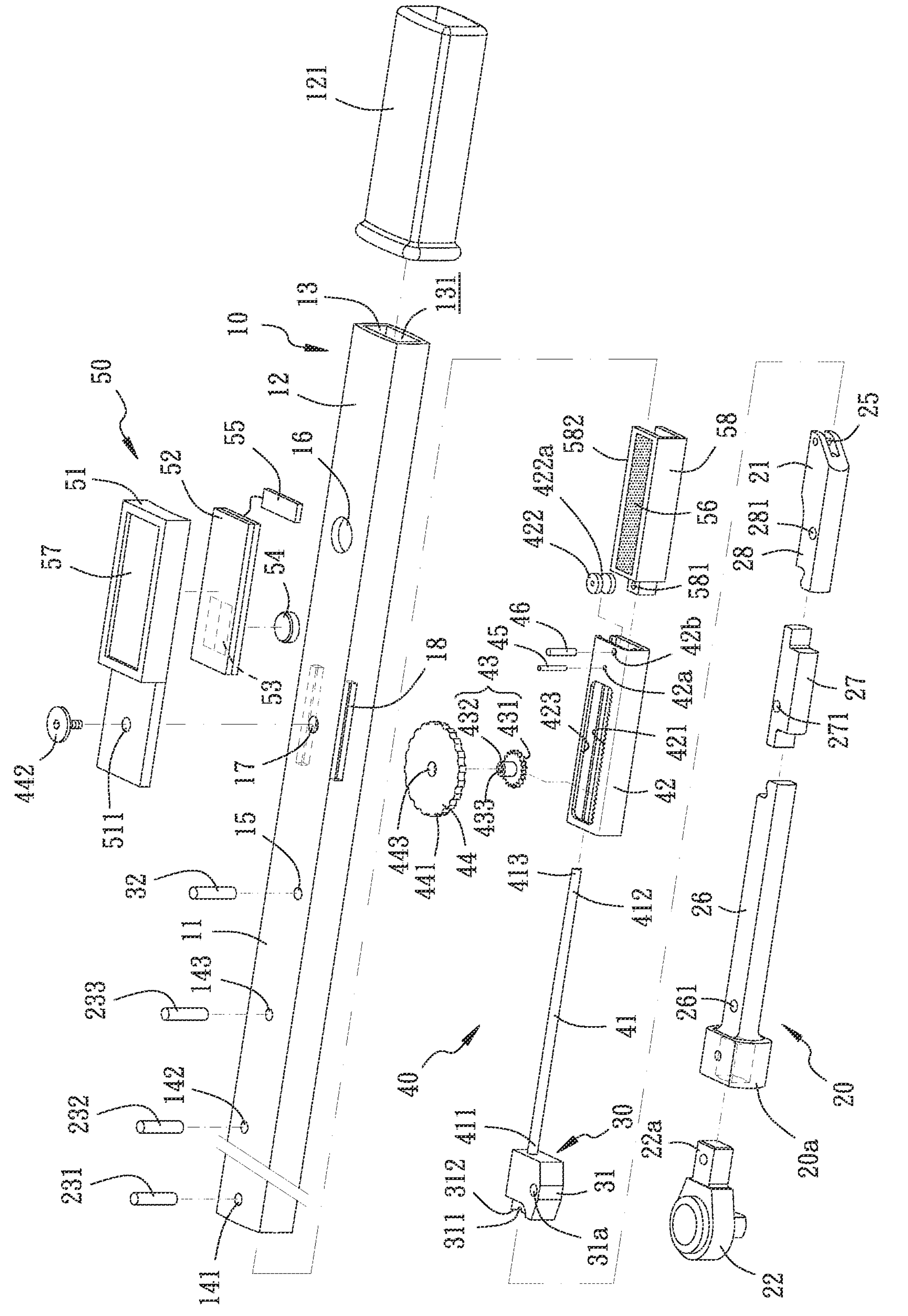
FIG. 9 is an exploded view of the torque wrench with digital display for torque adjustment in accordance with the second embodiment of the present invention.
Figure 10:
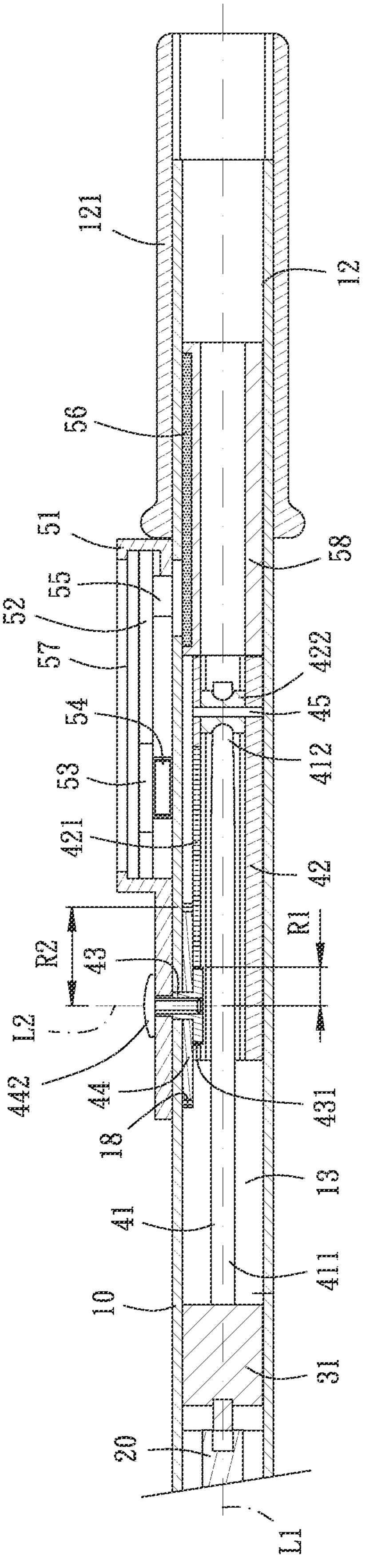
FIG. 10 is a partially exploded view of the torque wrench with digital display for torque adjustment in accordance with the second embodiment of the present invention.
Figure 11:
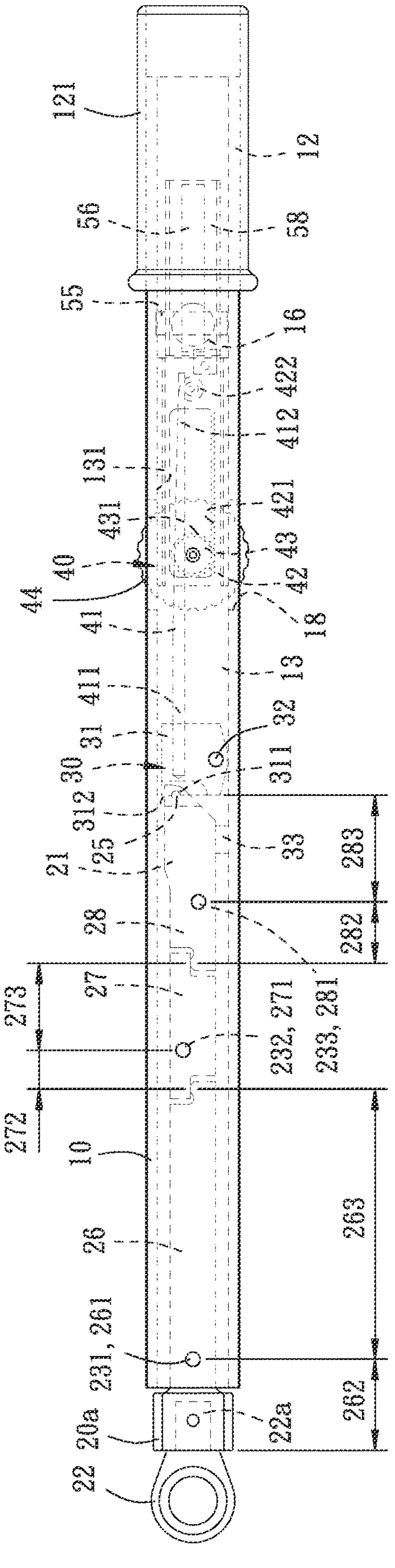
FIG. 11 is a schematic internal view of the torque wrench with digital display for torque adjustment in accordance with the second embodiment of the present invention.

Referring to FIG. 9 to FIG. 11, a second embodiment of the present invention is provided, wherein the same reference numbers represent the same elements, structures, and functions with that of the first embodiment, hence being omitted here. In this embodiment, the main body 10 comprises a through groove 18 disposed on two sides thereof in communication with the containing space 13. The modulating member 44 is rotatably disposed in the through groove 18 of the main body 10, such that at least a part of the outer periphery 441 of the modulating member 44 is exposed from the main body 10 to be rotationally operated.

The wrenching member 20 is a multi-linkage structure, comprising a first linkage 26, a second linkage 27, and a third linkage 28. The connecting part 21 is disposed on the third linkage 28, the wrenching part 22 is disposed on the first linkage 26, and the second linkage 27 is connected between the first linkage 26 and the third linkage 28.

The first linkage 26 comprises a first pivotal connection point 261. The first pivotal connection point 261 is a pivot hole, such that the first linkage 26 is pivotally connected to a first pivotal hole 141 of the main body 10 through a first fixing pin 231. The second linkage 27 comprises a second pivotal connection point 271. The second pivotal connection point 271 is a pivot hole, such that the second linkage 27 is pivotally connected to a second pivotal hole 142 of the main body 10 through a second fixing pin 232. The third linkage 28 comprises a third pivotal connection point 281. The third pivotal connection point 281 is a pivot hole, such that the third linkage 28 is pivotally connected to a third pivotal hole 143 of the main body 10 through a third fixing pin 233. Also, the first linkage 26, the second linkage 27, and the third linkage 28 respectively has a force imposing section 262, 272, 282 and a force resisting section 263, 273, 283 disposed on two sides of the first pivotal connection point 261, the second pivotal connection point 271, and the third pivotal connection point 281. The length of each force imposing section 262, 272, 282 is smaller than the length of each force resisting section 263, 273, 283. Accordingly, when the counterforce generated by the force imposed by the torque wrench 100 on the fastener is fed back through the multi-linkage structure and transmitted to the trigger mechanism 30, the counterforce is reduced through the leverage, thereby correspondingly increasing the torque value adjustment range of the torque sensing device 50. In this embodiment, the multi-linkage structure is able to reduce the counterforce to one-half to one-quarter of the original counterforce, whereby the torque value adjustment range of the torque sensing device 50 to two times to four times the original range, providing the convenience of usage and increasing the applicable range.

Also, in this embodiment of the present invention, the wrenching part 22 is removably disposed on the first linkage 26 of the wrenching member 20. The first linkage 26 of the wrenching member 20 comprises a first connecting end **20*a* away from the connecting part 21. The wrenching part 22 comprises a second connecting end 22*a* on one end. The second connecting end 22*a* is connected with the first connecting end 20*a* in a concave-convex connection manner. In this embodiment, the first connecting end 20*a* is a recess, and the second connecting end 22*a* is a protrusion. Therefore, the user is allowed to select a specific wrenching part 22 to be disposed on the wrenching member 20** according to different operation demands.

Also, the trigger mechanism 30 further comprises a counting member 33. The counting member 33 is disposed between the main body 10 and the connecting part 21, and electrically connected with the processing unit 53. In this embodiment of the present invention, the counting member 33 is disposed on the inner wall of the main body 10, so that the counting member 33 is able to, according to the trigger times of the triggering member 31, send a counting signal to be displayed on the digital display 57 (when the connecting part 21 sways, the trigger times are sensed through the contact relationship between the connecting part 21 and the counting member 33), allowing the user to know the times of the torque value of the torque wrench 100 exceeding the set torque value, thereby accurately fastening the fastener to the predetermined pound value. To facilitate the convenience of usage, in other embodiments, the digital display 57 comprises a reset button or a reset touch button, allowing the user to reset the number for restarting the counting operation.

Also, in this embodiment of the present invention, the torque sensing device 50 further comprises a holding body 58 which is formed in an approximate frame shape. The holding body 58 has one end connected with the moving member 42 through one fixing pin 46 passing through a pivot hole **42*b* of the moving member 42 and a pivot hole 581 of the holding body 58, so as to move along with the moving member 42. The sensed member 56 is disposed on the plane 582 of the holding body 58**, thereby providing the effect as mentioned above.

With the foregoing configuration, the present invention achieves following advantages:

The present invention converts the rotation operation into a linear movement, facilitating an efficient and easily adjustment from the minimum torque to the maximum torque, and also facilitating an efficient and easily adjustment from the maximum torque to the minimum torque.

The second rotation radius R2 of the modulating member 44 is larger than the first rotation radius R1 of the transmission gear 43, achieving the efficient torque value adjustment effect, providing a time-saving effect. Further, the present invention takes the engagement of the transmission gear 43 and the moving member 42 as the transmission mechanism, without any resistance of spring during the adjustment process, thereby achieving the labor-saving effect as well.

The second rotation radius R2 of the modulating member 44 is large, facilitating the easiness of rotation operation, whereby the torque adjustment device 40 achieves a fine adjustment of torque.

The torque sensing device 50 uses a non-contact sensing, which is able to prevent the sensing effect from being affected by external environment and achieves a longer service life, thereby achieving the highly accurate torque value setting and judgement.

The contact relationship between the abutting part 422 and the elastic member 41 is rolling contact, so that the contact between the two does not cause wearing and produce iron chippings, thereby not affecting the torque value presentation and improving the service life.

The present invention has a simple overall structure, an efficient assembly process, and a low manufacturing cost.

What is claimed is:

1. A torque wrench with digital display for torque adjustment, comprising:

a main body comprising a first end and a second end away from the first end;

a wrenching member pivotally disposed on the main body and able to sway with respect to the main body, the wrenching member comprising a wrenching part exposed out of the main body and a connecting part pivotally connected with the first end of the main body, the connecting part comprising a contacting end away from the wrenching part;

a trigger mechanism disposed in the main body and contacting the contacting end of the connecting part;

a torque adjustment device disposed in the main body and connected with the trigger mechanism, the torque adjustment device being operated by a user to adjust a predetermined torque, the torque adjustment device comprising an elastic member, a moving member, a transmission gear, and a modulating member, the elastic member comprising a fixing end and a free section connected with the fixing end, the fixing end is fixed to the trigger mechanism, the moving member is slidably disposed in the main body along an axis direction of the main body, the moving member comprises an abutting part, against which the free section abuts when bearing a force imposed thereon, the moving member comprising a first tooth part disposed along a direction in parallel to the axis, the transmission gear comprising a second tooth part which is engaged with the first tooth part, the modulating member being connected with the transmission gear, the modulating member being configured to be rotated by the user to drive the moving member to generate a linear sliding relationship with respect to the main body, facilitating an positional adjustment of the abutting part with respect to the free section;

a torque sensing device disposed on the main body corresponding to the position of the torque adjustment device, the torque sensing device being configured to sense a displacement variation of the moving member, so as to display a torque value on a digital display.

2. The torque wrench with digital display for torque adjustment of claim 1, wherein the modulating member is rotatably disposed on the main body along a central line direction; the transmission gear rotates about the central line disposed along a direction in perpendicular to the axis; the central line is orthogonal to the axis; the second tooth part is disposed surrounding a central line;

the main body comprises a containing space; the containing space comprises a guiding part therein; the moving member is slidably disposed in the main body along the guiding part.

3. The torque wrench with digital display for torque adjustment of claim 2, wherein the transmission gear comprises a first rotation radius; the second tooth part is disposed along the first rotation radius; the modulating member comprises a second rotation radius; the second rotation radius is larger than the first rotation radius; the transmission gear is coaxially disposed with the modulating member.

4. The torque wrench with digital display for torque adjustment of claim 3, wherein the trigger mechanism is swayable between a first position and a second position; when the trigger mechanism is at the first position, the modulating member is configured to be rotated by the user to drive the moving member to adjust a position of the abutting part with respect to the free section;

when the trigger mechanism is at the second position, the elastic member allows the trigger mechanism to provide a force for the wrenching member to be recovered.

5. The torque wrench with digital display for torque adjustment of claim 4, wherein the abutting part is rotatably mounted relative to the moving member, and the abutting part is in a roll contact with the free section of the elastic member; the moving member is a frame shape; the elastic member passes through the moving member; when the torque wrench is used for wrenching and imposing a force, the elastic member generates a bending deformation in the moving member; the moving member comprises a movement groove, and the first tooth part is disposed on one side of an inner edge of the movement groove; the free section of the elastic member comprises an abutting section having a semi-circular section disposed on a lateral face of the free section;

the abutting part comprises a supporting groove; the supporting groove is formed in a semi-circular concave shape and cooperates with the abutting section.

6. The torque wrench with digital display for torque adjustment of claim 3, wherein the torque sensing device comprises a sensing member and a sensed member; the digital display is electrically connected with the sensing member; the sensed member is disposed on the moving member to move along with it; the sensing member is configured to sense a displacement variation of the sensed member in a non-contact manner to generate a torque signal;

and the digital display displays the torque value according to the torque signal.

7. The torque wrench with digital display for torque adjustment of claim 6, wherein the torque sensing device further comprises a casing, a circuit board, a processing unit, and a power source; the digital display is disposed on a surface of the casing and electrically connected with the processing unit; the circuit board is disposed between the casing and the main body; the sensing member and the processing unit are disposed on the circuit board; the power source provides a power of the torque sensing device; the main body comprises a containing space and a through hole passing through the containing space; the sensing member senses the sensed member through the through hole.

8. The torque wrench with digital display for torque adjustment of claim 7, wherein the torque sensing device further comprises a holding body having one end connected with the moving member; the sensed member is disposed on a plane of the holding body; the main body further comprises a handgrip member mounted around the second end of the main body; a distance from the modulating member to the handgrip member is larger than a distance from the digital display to the handgrip member.

9. The torque wrench with digital display for torque adjustment of claim 8, wherein the modulating member comprises an outer periphery arranged along the second rotation radius; at least a part of the outer periphery is exposed from the main body.

10. The torque wrench with digital display for torque adjustment of claim 8, wherein the main body is hollow; the wrenching member is inserted into the first end to be pivotally connected with the main body; the trigger mechanism comprises a triggering member and a positioning pin; the triggering member is pivotally connected with the main body through the positioning pin; the triggering member is connected and fixed to the fixing end of the elastic member;

the triggering member is allowed to be releasably connected with the contacting end of the wrenching member; when a wrenching force of the torque wrench is larger than a torque value of the torque adjustment device, the triggering member is released from the contacting end, and the triggering member pivotally sways with respect to the main body; when the wrenching force of the torque wrench is smaller than the torque value of the torque adjustment device, the triggering member and the contacting end are able to automatically recover to an original contacting status.

11. The torque wrench with digital display for torque adjustment of claim 10, wherein the triggering member comprises a connection recess on one side facing the contacting end; the connection recess has one side connected with a recovering bevel; the contacting end is a circular pin releasably connected between the connection recess and the recovering bevel; when the wrenching force of the torque wrench is larger than the torque value of the torque adjustment device, the contacting end is located at the recovering bevel; when the wrenching force of the torque wrench is smaller than the torque value of the torque adjustment device, the recovering bevel automatically guides the triggering member, so that the connection recess is recovered to the contacting status with the contacting end.

12. The torque wrench with digital display for torque adjustment of claim 10, wherein the wrenching part is removably disposed on the wrenching member; the wrenching member comprises a first connecting end away from the connecting part; the wrenching part comprises a second connecting end on one end; the second connecting end is connected with the first connecting end in a concave-convex connection manner.

13. The torque wrench with digital display for torque adjustment of claim 10, wherein the wrenching member is a multi-linkage structure;

the wrenching member comprises a first linkage, a second linkage, and a third linkage; the first linkage, the second linkage, and the third linkage are pivotally disposed in the main body; the connecting part is disposed on the third linkage, the wrenching part is disposed on the first linkage, the second linkage is connected between the first linkage and the third linkage; the first linkage comprises a first pivotal connection point pivotally disposed in the main body, the second linkage comprises a second pivotal connection point pivotally disposed in the main body, and the third linkage comprises a third pivotal connection point pivotally disposed in the main body; the first linkage, the second linkage, and the third linkage respectively has a force imposing section and a force resisting section disposed on two sides of the first pivotal connection point, the second pivotal connection point, and the third pivotal connection point; a length of each force imposing section is smaller than a length of each force resisting section.

* * * * *